(12) United States Patent
Santos Moraes et al.

(10) Patent No.: US 10,915,572 B2
(45) Date of Patent: Feb. 9, 2021

(54) IMAGE CAPTIONING AUGMENTED WITH UNDERSTANDING OF THE SURROUNDING TEXT

(71) Applicant: INTERNATIONAL BUSINESS MACHINES CORPORATION, Armonk, NY (US)

(72) Inventors: Priscilla Santos Moraes, Pflugerville, TX (US); Shunguo Yan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 112 days.

(21) Appl. No.: 16/205,880

(22) Filed: Nov. 30, 2018

(65) Prior Publication Data
US 2020/0175063 A1 Jun. 4, 2020

(51) Int. Cl.
*G06F 16/583* (2019.01)
*G06F 16/51* (2019.01)
*G06F 16/901* (2019.01)

(52) U.S. Cl.
CPC ........... *G06F 16/583* (2019.01); *G06F 16/51* (2019.01); *G06F 16/9024* (2019.01)

(58) Field of Classification Search
CPC ..... G06F 16/583; G06F 16/51; G06F 16/9024
See application file for complete search history.

(56) References Cited

U.S. PATENT DOCUMENTS

| | | | |
|---|---|---|---|
| 9,009,143 B2 | 4/2015 | Thazhathekalam et al. | |
| 9,098,532 B2 | 8/2015 | Cragun et al. | |
| 2008/0215561 A1 | 9/2008 | Yu et al. | |
| 2014/0351687 A1* | 11/2014 | Hall | G06F 16/957 715/234 |
| 2015/0067471 A1 | 3/2015 | Bhardwaj et al. | |
| 2017/0061250 A1 | 3/2017 | Gao et al. | |

(Continued)

OTHER PUBLICATIONS

Krause et al., "A Hierarchical Approach for Generating Descriptive Image Paragraphs," 2017 IEEE Conference on Computer Vision and Pattern Recognition (CVPR), Jul. 21-26, 2017, Honolulu, HI.

(Continued)

*Primary Examiner* — Leon Flores
(74) *Attorney, Agent, or Firm* — Brian D. Welle

(57) ABSTRACT

To augment an image caption, a caption graph containing entity nodes corresponding to entities contained in the image and relationship edges between entity nodes corresponding to relationships between entities as illustrated in the image is generated. In addition, a contextual graph containing one or more of entity nodes corresponding to entities contained in the image and described in text associated with the image, textual entity nodes corresponding to textual entities described in text associated with the image and textual relationship edges between entity node pairs, textual entity node pairs and entity node and textual entity node pairs is generated. The textual relationship edges correspond to relationships described in the text associated with the image between entity pairs, textual entity pairs or entity and textual entity pairs. From the contextual graph, an augmented caption graph containing entity nodes, relationship edges, textual entities and textual relationship edges is generated.

20 Claims, 6 Drawing Sheets

(56) References Cited

U.S. PATENT DOCUMENTS

2017/0098153 A1  4/2017  Mao et al.
2017/0200065 A1  7/2017  Wang et al.
2018/0144208 A1  5/2018  Lu et al.

OTHER PUBLICATIONS

Liu et al., "An Adaptive Graph Model for Automatic Image Annotation," MIR'06, Oct. 26-27, 2006, Santa Barbara, CA.

Marino et al., "The More You Know: Using Knowledge Graphs for Image Classification," 2017 IEEE Conference on Computer Vision and Pattern Recognition (CVPR), Jul. 21-26, 2017, Honolulu, HI.

Mathews et al., "SentiCap: Generating Image Descriptions with Sentiments," AAAI '16 Proceedings of the Thirtieth AAAI Conference on Artificial Intelligence, Feb. 12-17, 2016, Phoenix, AZ.

Mogadala et al., "Knowledge Guided Attention and Interference for Describing Images Containing Unseen Objects," The Semantic Web, ESWC 2018, Lecture Notes in Computer Science, vol. 10843, Springer, Cham.

Shen et al., "Giving Meanings to WWW Images," Multimedia '00, Proceedings of the eighth ACM International Conference on Multimedia, Oct. 30-Nov. 3, 2000, pp. 39-47, Los Angeles, CA.

Tran et al., "Rich Image Captioning in the Wild," 2016 IEEE Conference on Computer Vision and Pattern Recognition Workshops (CVPRW), Jun. 26-Jul. 1, 2016, Las Vegas, NV.

Watson, "Natural Language Understanding," Natural Language Understanding Demo, retrieved from Internet Sep. 5, 2018, https://natural-language-understanding-demo.ng.bluemix.net.

Zheng et al., "Weakly-supervised image captioning based on rich contextual information," Multimedia Tools and Applications, Jul. 2018, vol. 77, No. 14, pp. 18583-18599.

\* cited by examiner

IMAGE CAPTIONING AUGMENTED WITH UNDERSTANDING OF THE SURROUNDING TEXT

FIELD OF THE INVENTION

The present invention relates to digital image captioning.

BACKGROUND OF THE INVENTION

Computing systems display information in both textual and graphical formats. Graphical formats include images displayed on a screen. The images can be incorporated into text that is also displayed on the screen, can be associated with captions that are typically displayed below the image or can be added as a metadata or property for an image. The images are stored as computer readable files, and to display the images, these computer readable files are accessed. When the computer readable files are unavailable, text that describes the content of the image can be displayed in place of the image. This text is known as ALT text. The image description or ALT text is also used to help a blind or visually impaired user understand the image by converting the ALT text to an audio output using a screen reader. Image descriptions or ALT text are conventionally added to documents or web-pages manually by the content author or developer. However, not all authors provide ALT text, and the content and quality of ALT text varies among authors. Therefore, methods have been implemented for automatic generation of image descriptions or ALT text. For example, artificial intelligence (AI), especially deep learning and its use in image recognition and Natural Language Processing (NLS) have been used to generate image descriptions. One exemplary system is the Show and Tell caption system that is commercially available from Google LLC of Mountain View, Calif. and that automatically produces captions that describe images.

In general, the quality of the captions generated by automated image captioning systems is improving. These image captioning systems describe, with good accuracy, objects in an image and the relationships among the objects as reflected in the image. However, conventional image captioning systems fail to provide contextualization of the image with regards to text in which the image is embedded, for example, the text of the web page in which the image appears. Therefore, captioning system are still desired that leverage existing algorithms and augment available captions to provide enriched and enhanced image captions.

SUMMARY OF THE INVENTION

Exemplary embodiments are directed to systems and methods that augment an image caption with contextualization. The caption can be a caption manually created by an author or a caption automatically generated by a system. The contextualization includes, for example, emotion, entity identification, concept identification, tone analysis and semantic identification of relationships between entities in the image. Contextualization is derived from text surrounding and displayed with the image. The text surrounding the image is identified and processed using natural language understanding. The image caption and the natural language understanding of the text surrounding the image are each represented by a separate graph. A knowledge graph is created from these two separate graphs by overlying the two graphs to recalculate the nodes and edges importance in those two graphs. In the resulting trained knowledge graph, the entities and relations identified from the image caption may have a higher weight for being included in the augmented caption, while their descriptions are augmented by the attributes and relations from the natural language contextual analysis of the surrounding text. The importance of entities and relationships can also be augmented by analysis of the emotion and tone used to describe them or the strength of the entities and relations, for example, selection of adjective and conjunction words, among others.

Exemplary embodiments are directed to a method for augmenting an image caption. A caption graph for an image is generated. The caption graph includes entity nodes corresponding to entities contained in the image and relationship edges between entity nodes corresponding to relationships between entities as illustrated in the image. A contextual graph for the image is generated. The contextual graph includes one or more of entity nodes corresponding to entities contained in the image and described in text associated with the image, textual entity nodes corresponding to textual entities described in text associated with the image and textual relationship edges between one or more of entity node pairs, textual entity node pairs and entity node and textual entity node pairs. The textual relationship edges correspond to relationships described in the text associated with the image between entity pairs, textual entity pairs or entity and textual entity pairs. The contextual graph is used to generate an augmented caption graph containing the entity nodes, the relationship edges and one or more textual relationship edges.

Exemplary embodiments are directed to a computer-readable medium containing a computer-readable code that when read by a computer causes the computer to perform a method for augmenting an image caption. A caption graph for an image is generated. The caption graph includes entity nodes corresponding to entities contained in the image and relationship edges between entity nodes corresponding to relationships between entities as illustrated in the image. A contextual graph for the image is generated. The contextual graph includes one or more of entity nodes corresponding to entities contained in the image and described in text associated with the image, textual entity nodes corresponding to textual entities described in text associated with the image and textual relationship edges between one or more of entity node pairs, textual entity node pairs and entity node and textual entity node pairs. The textual relationship edges correspond to relationships described in the text associated with the image between entity pairs, textual entity pairs or entity and textual entity pairs. The contextual graph is used to generate an augmented caption graph containing the entity nodes, the relationship edges and one or more textual relationship edges.

Exemplary embodiments are directed to a system for augmenting an image caption. The system includes a database storing image files for one or more images, text files containing text to be displayed in association with each image and ALT text associated with one or more images and a caption generating system to obtain a description of the image, a natural language processor to use the description of the image to identify entities and relationships among the entities in the given image and to analyze text to be displayed in association with the given image to identify entities contained in the given image and described in the text, textual entities described in the text and textual relationships described in the text between entity pairs, textual entity pairs or entity and textual entity pairs. The system also includes a knowledge graph builder to use the identified entities and relationships among the entities to generate a caption graph for the given image. The caption graph includes entity nodes corresponding to the entities contained in the image and relationship edges between entity nodes corresponding to the relationships between entities. The knowledge graph builder generates a contextual graph for the image. The contextual graph includes one or more of entity nodes corresponding to entities contained in the image and described in text associated with the entity, textual entity nodes corresponding to textual entities described in text associated with the image and textual relationship edges between one or more of entity node pairs, textual entity node pairs and entity node and textual entity node pairs. The knowledge graph builder overlays the caption graph and the contextual graph by aligning common edges and nodes to generate an augmented caption graph and assigns a relevance weight to each one of a plurality of portions of the contextual graph that corresponds to a percentage overlap in the augmented caption graph between a given portion of the contextual graph and the caption graph. The textual relationships include emotion, concepts, tone, semantic identification of relationships between entities and combinations thereof.

DETAILED DESCRIPTION

Figure 1:
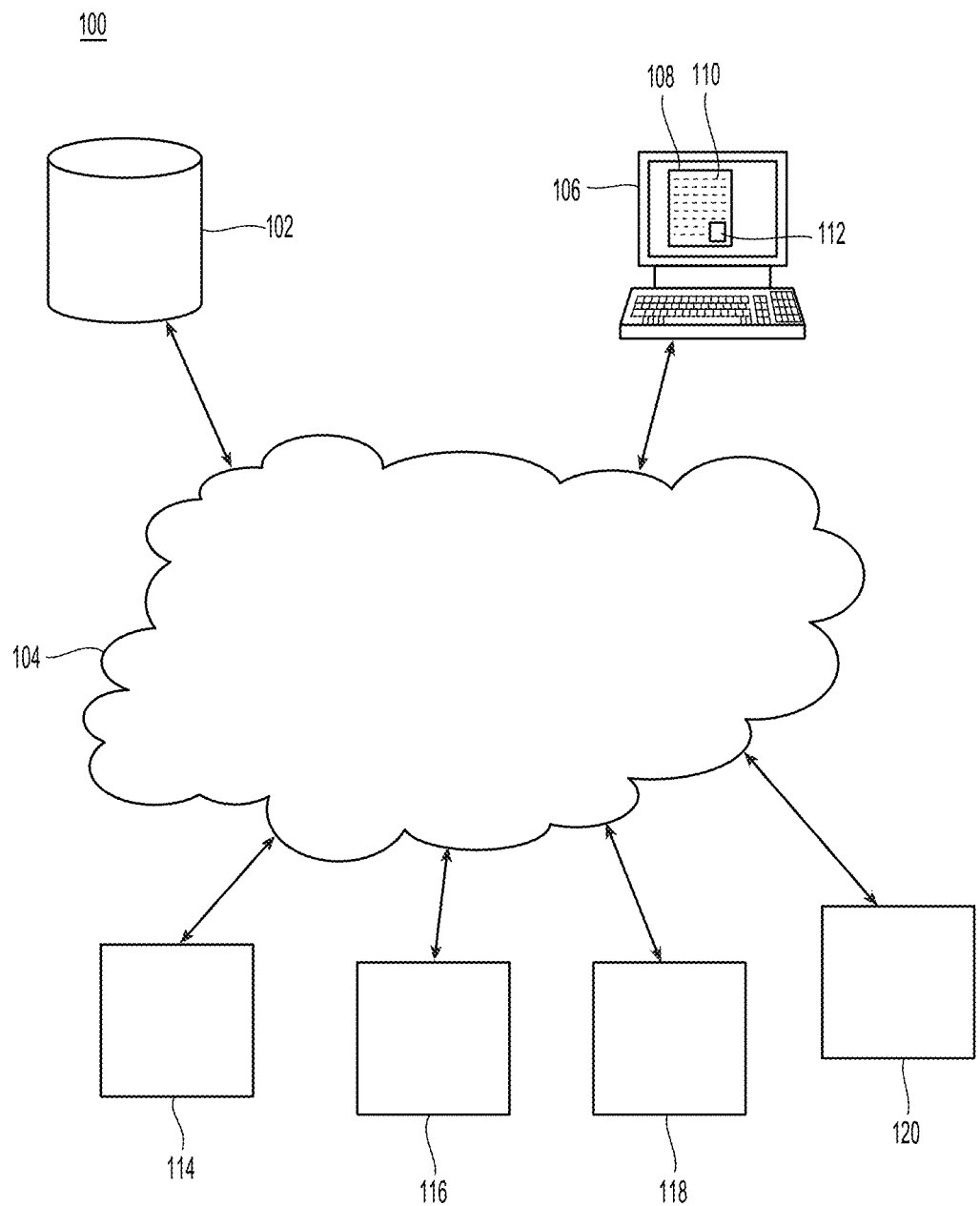
FIG. 1 is a schematic representation of an embodiment of a system for generating an augmented image caption.

Exemplary embodiments are directed to systems and methods for generating augmented captions for displayed images. In one embodiment, the augmented captions are generated automatically. The augmented caption combines entities and relationships among the entities as illustrated in the image with contextualization derived from text displayed with and surrounding the image. Suitable contextualization includes, but is not limited to, emotion, entity and concept identification, tone analysis, semantic identification of relationships between entities and combinations thereof.

The augmented caption is generated from a knowledge graph or augmented caption graph created by overlying a caption graph generated from a description of the image and a contextual graph generated from the surrounding text. In one embodiment, the description of the image is an existing description provided with the image as a caption or ALT text. Alternatively, the description of the image is generated using, for example, deep learning analysis of the image. In one embodiment, the caption graph is generated using natural language processing of the description of the image, and the contextual graph is generated using natural language processing and understanding of the text or content surrounding the image. Overlying the contextual graph on the caption graph through alignment of common nodes and edges in the graph produces the augmented caption graph. The overlying contextual graph is used to determine or to recalculate the nodes and edges importance in the original caption graph and the augmented caption graph.

In the augmented caption graph or knowledge graph, the entities and relationships identified from the image caption, i.e., from the caption graph, may have a greater associated relevance for inclusion in any augmented caption over new textual entities and new textual relationships derived from the surrounding text. However, the contextualization derived from the textual entities and textual relationships derived from the surrounding text and expressed in the contextual graph are desired for augmenting the entities and relationships contained in the caption graph. The importance and relevance of original entities and relationships from the caption graph are augmented by analysis of the emotion and tone used to describe them or the strength of the entities and relations as illustrated in the contextual graph, for example, as adjectives and conjunction words.

For a given document, e.g., web page, article or other document displayed in electronic format, or portion of a given document containing an image, the image is sent to a caption generation system. The text surrounding the image is sent to a natural language processing (NLP) tool. Suitable NLP tools include Watson Natural Language Understanding, which is commercially available from the International Business Machines Corporation of Armonk, N.Y. The NLP tool processing the text and identifies, for example, semantically, emotion, entities, concepts, tone and relationships between entities as illustrated in the image associated and described in the text. The description or caption of the image generated by the caption generation system is also sent to the NLP tool to identify entities and relationships in the description or caption that was derived from the image. In one embodiment, the description including the entities and relationships derived from the image do not contain contextualization, e.g., are agnostic to emotion and tone.

The entities, relationships, textual entities and textual relationships generated from NLP of the surrounding text and the description of the content of the image are used to build two knowledge graphs, a contextual graph and a caption graph. A third version of a knowledge graph is created by overlying the two graphs and aligning the common nodes and edges from the two graphs. The nodes and edges importance in the third knowledge graph, i.e., the augmented caption graph, are determine or recalculated, for example, based on amount or percentage of overlap between the caption graph and the contextual graph. In one embodiment, importance is expressed as a relevance weight assigned to portions of the augmented caption graph or portions of the contextual graph. The entities and relations identified in the image caption have a greater associated relevance weight for being included in an augmented caption for the image; however, the descriptions of the entities are augmented by the contextual attributes and relations expressed in the contextual graph. In one embodiment, the importance of entities and relationships in the image are determined from the associated text through analysis of the emotion and tone of the text describing the entities or the strength of the entities and relationships, which can be computed based on their position in the text or the number of times an entity is mentioned in the text.

The resulting augmented caption graph is then used to generate an augmented caption for the image. In one embodiment, a natural language generation (NLG) engine runs on top of the augmented caption graph, describing the nodes, i.e., entities and textual entities, and edges, i.e., relationships and textual relationships, having a relevance weight above a predetermined threshold. The resulting description is an augmented caption graph that is associated with the image and can be displayed with the image, stored as ALT text or used to provide an audible description of the image. Therefore, exemplary embodiments utilize an enhanced machine learning system and method that produces more accurate image captions.

Referring initially to FIG. 1, exemplary embodiments are directed to a system for augmenting an image caption 100. The system includes at least one database 102 storing image files for one or more images, text files containing text to be displayed in association with each image and ALT text associated with one or more images. Suitable formats for the image files, text files and ALT text are known and available in the art. The image files, text files and ALT text are accessible by user equipment 106 across one or more local or wide area networks 104. Suitable use equipment includes, but is not limited to, personal computers, laptop computers, servers, smartphones, tablet computers and netbook computers. The user equipment utilizes the image files, text files and ALT text to display a document 108 containing the image 112 and the associated text 110.

The system for augmenting an image caption includes all of the components, including processing and communication components, for augmenting an image caption. These components can be individual components executing on separate systems in a distributed or cloud-based computing system or can be individual modules executing on a given computing system or server platform. These components include a caption generating system 114 in communication with the databased and user equipment to obtain a description of the image. In one embodiment, the image 112 may include an existing description, for example, a caption that is displayed with the image or that is included as ALT text associated with the image. Alternatively, the description of the image is generated by the caption generating system. In one embodiment, the caption generating system uses a machine learning tool such as a deep learning service to generate or to obtain the description of the image. In one embodiment, the caption generating system utilizes artificial intelligence or model trained through machine learning to identify entities and relationships between entities in an image.

The system for augmenting an image caption includes a natural language processor 116 in communication with the database and the caption generating system to use the description of the image to identify entities and relationships among the entities displayed in the given image. In one embodiment, the entities and relationships are identified illustrated in the image are identified in a neutral context, i.e., without tone and emotion. The natural language processor also processes and analyzes text 110 to be displayed in association with the given image to identify entities contained in the given image and described in the text, textual entities described in the text and textual relationships described in the text between entity pairs, textual entity pairs or entity and textual entity pairs. The textual entities are entities described in the text with regard to the image but are not illustrated in the image. In one embodiment, the system for augmenting an image caption identifies and extracts the text that is relevant to the image. Suitable methods for identifying and extracting the relevant text include keyword searching in the text and spatial recognition of text displayed close to the image.

The system for augmenting an image caption includes a knowledge graph builder 118 in communication with the natural language processor. The knowledge graph builder uses the identified entities and relationships among the entities to generate a caption graph for the given image. The caption graph includes entity nodes corresponding to the entities contained in the image and relationship edges between entity nodes corresponding to the relationships between entities. The knowledge graph builder also generates a contextual graph for the image. The contextual graph includes contextual information associated with the image such as emotion or tone, which can be positive, negative or neutral and is derived from the text displayed with the image. The contextual graph includes one or more of entity nodes corresponding to entities contained, i.e., displayed, in the image and also described in text associated with the entity, textual entity nodes corresponding to textual entities described in text associated with the image, but not appearing in the actual image, and textual relationship edges between one or more of entity node pairs, textual entity node pairs and entity node and textual entity node pairs.

The knowledge graph builder overlays the caption graph and the contextual graph by aligning common edges and nodes to generate an augmented caption graph. The augmented caption graph includes one or more or entities nodes, relationships edges, textual entity nodes and textual relationship edges. The textual entity nodes and textual relationship edges contribute the desired context or textual relationships to the entities and relationships in the caption graph. Suitable textual relationships include, but are not limited to, emotion, concepts, tone, semantic identification of relationships between entities and combinations thereof. In order to determine which portions, i.e., textual entity nodes and textual relationships edges, to use in generated an augmented caption for the image, the knowledge graph builder assigns a relevance weight to each one of a plurality of portions of the augmented caption graph or contextual graph. These portions include portions of the caption graph and portions of the contextual graph. In one embodiment, the relevance weight corresponds to a percentage overlap in the augmented caption graph between a given portion of the contextual graph and the caption graph.

In one embodiment, the system for augmenting an image caption includes a natural language generation engine 120 in communication with the knowledge graph builder, the database and the user equipment. The natural language generation engine uses the augmented caption graph to generate a natural language description of the image. In one embodiment, the natural language image describes the caption graph and those portions of the contextual graph having an assigned relevance weight above a predetermined threshold. The resulting natural language description of the image is an augmented image caption that includes the desired context and that can be used as a caption displayed with the image or as ALT text associated with the image. In one embodiment, the resulting natural language description is used to produce an audible description of the image. The natural language description, the augmented image caption, ALT text and any audio file are stored in the database in association with the image for use when the image is displayed in the document. As a given image can be displayed in multiple documents having different context, any given image can have multiple associated augmented image captions and associated files stored with the image. The appropriate augmented image captions are obtained based on the current context in which the image is displayed.

Figure 2:
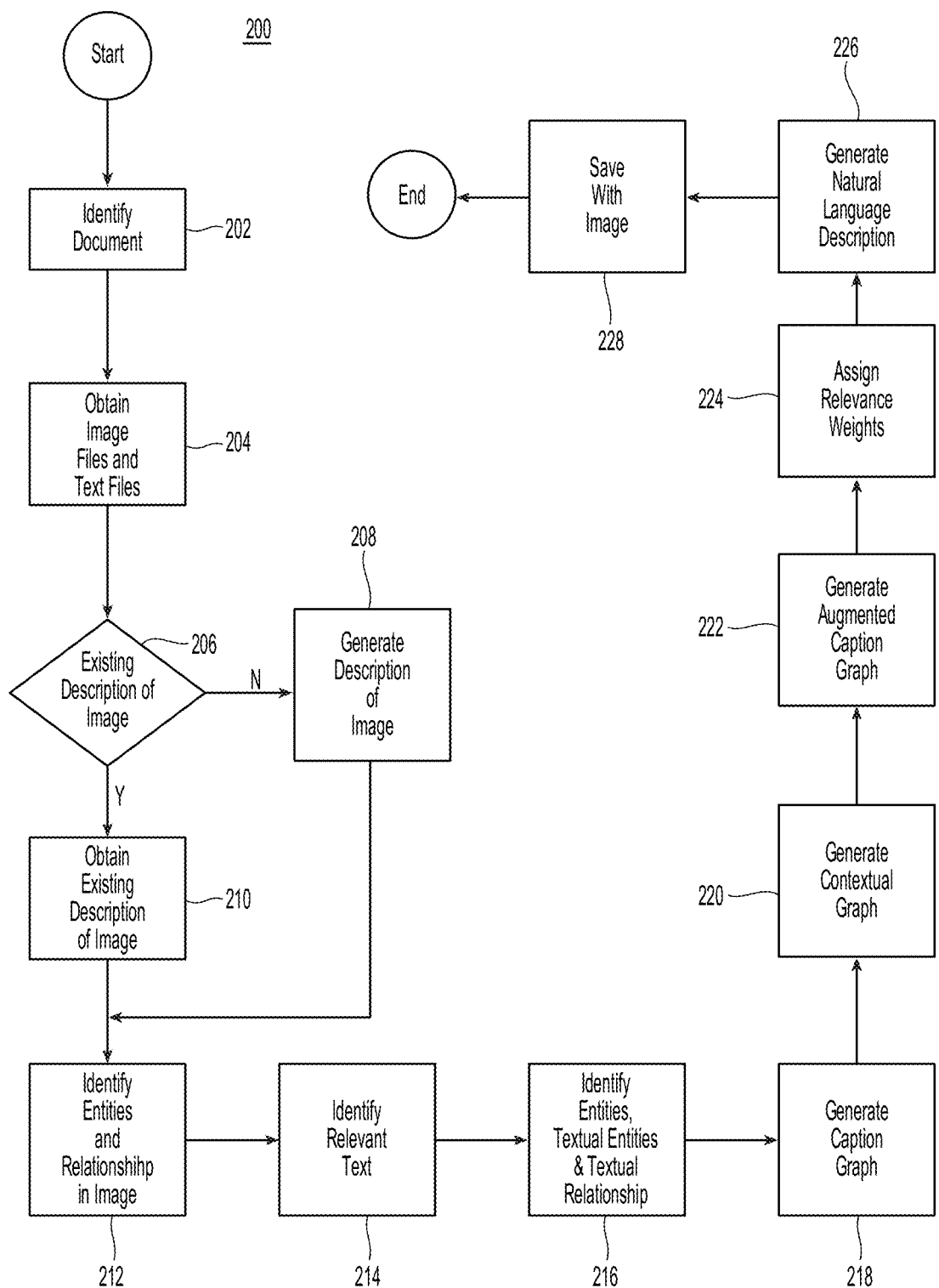
FIG. 2 is a flow chart illustrating an embodiment of a method for generating an augmented image caption.

Referring now to FIG. 2, exemplary embodiments are also directed to a method for augmenting an image caption 200. A document for which an augmented image caption is to be generated is identified 202. The document can be any suitable document that includes both text and an image stored in electronic format for display on a suitable device or platform. These documents include journal, newspaper or magazine articles, web pages and advertisements. The devices include desktop and laptop computers, tablets, netbooks, smartphones, personal digital assistants and televisions. The image files and all text files associated with and to be displayed with the image file are obtained 204. Any suitable format for image and text files known and available in the art can be used.

The image file can have an associated description generated by the author of the document or creator of the image that describes the contents of the image. These descriptions include, for example, a caption to be displayed with the image or ALT text associated with the image and combinations thereof. Therefore a determination is made regarding whether a description of the image exists 206. If the description exists, the existing description is obtained 210. If the description does not exists, then the desired description of entities and relationships between entities illustrated in the image is obtained 208. In one embodiment, deep learning is used to extract the description of the image. The existing or generated description of the image is used to identify entities illustrated in the image and relationships among the entities as illustrated in the image 212. Suitable entities include persons within the image and objects within the image. Suitable methods for identifying entities and relationships among the entities includes using natural language processing. Preferably, the entities and relationships are identified to be contextually neutral, e.g., tone agnostic and emotion agnostic, with regard to the entities and relationships between entities.

Text contained in the obtained text files that is relevant to the image is identified 214. Suitable methods for identifying relevant text include searching for key words and identifying text displayed in close proximity to the image. From the relevant text, entities illustrated in the image and described in the text, textual entities described in the text and textual relationship described in the text between entities, textual entities or a given entity and a given textual entity are identified 216. Suitable methods for identifying entities, textual entities and textual relationships include using natural language processing.

The entities and relationships within the image derived from the description of the image are used to generate a caption graph for an image 218. In one embodiment, the caption graph includes entity nodes corresponding to entities contained in the image and relationship edges between entity nodes corresponding to relationships between entities as illustrated in the image. In one embodiment, the relationship edges correspond to tone agnostic and emotion agnostic relationships between entities as illustrated in the image.

Similarly, the identified entities, textual entities and textual relationships contained in the relevant text associated with the image are used to generate a contextual graph for the image 220. In one embodiment, the contextual graph includes one or more of entity nodes corresponding to entities contained in the image and described in text associated with the image, textual entity nodes corresponding to textual entities described in text associated with the image and textual relationship edges between one or more of entity node pairs, textual entity node pairs and entity node and textual entity node pairs. The textual relationship edges correspond to relationships described in the text associated with the image between entity pairs, textual entity pairs or entity and textual entity pairs. Preferably, the textual relationship edges include relationships between entities that include relevant context, i.e., express tone or emotion.

The contextual graph is used to generate an augmented caption graph 222. In one embodiment, the contextual graph is used to generate the augmented caption graph by overlying the contextual graph on the caption graph, aligning common nodes and edges in the two graphs. The resulting augmented caption graph includes entity nodes, the relationship edges and one or more textual relationship edges. In one embodiment, the augmented caption graph also includes one or more textual entity nodes. Having generated the augmented caption graph, relevance weights are assigned to the augmented caption graph 224, this includes assigning relevance weights to portions of the caption graph contained in the augmented caption graph and portions of the contextual graph contained in the augmented caption graph. In one embodiment, a relevance weight is assigned to each one of a plurality of portions of the contextual graph. Each one of the plurality of portions of the contextual graph is a triple containing an entity pair connected by an edge. Similarly, a relevance weight is assigned to each one of the plurality of portions of the caption graph. In one embodiment, a relevance weight corresponding to a percentage overlap between a given portion of the contextual graph and the caption graph is assigned. This percentage overlap relevance can be normalized to a value between 0 and 1, with 1 corresponding to a complete overlap. In one embodiment, portions of the augmented caption graph that corresponding to portions of the caption graph are assigned a weight of 1. Portions of the augmented caption graph corresponding solely to the contextual graph with little or no overlap with the original caption graph are assigned a weight at or near 0.

Figure 3:
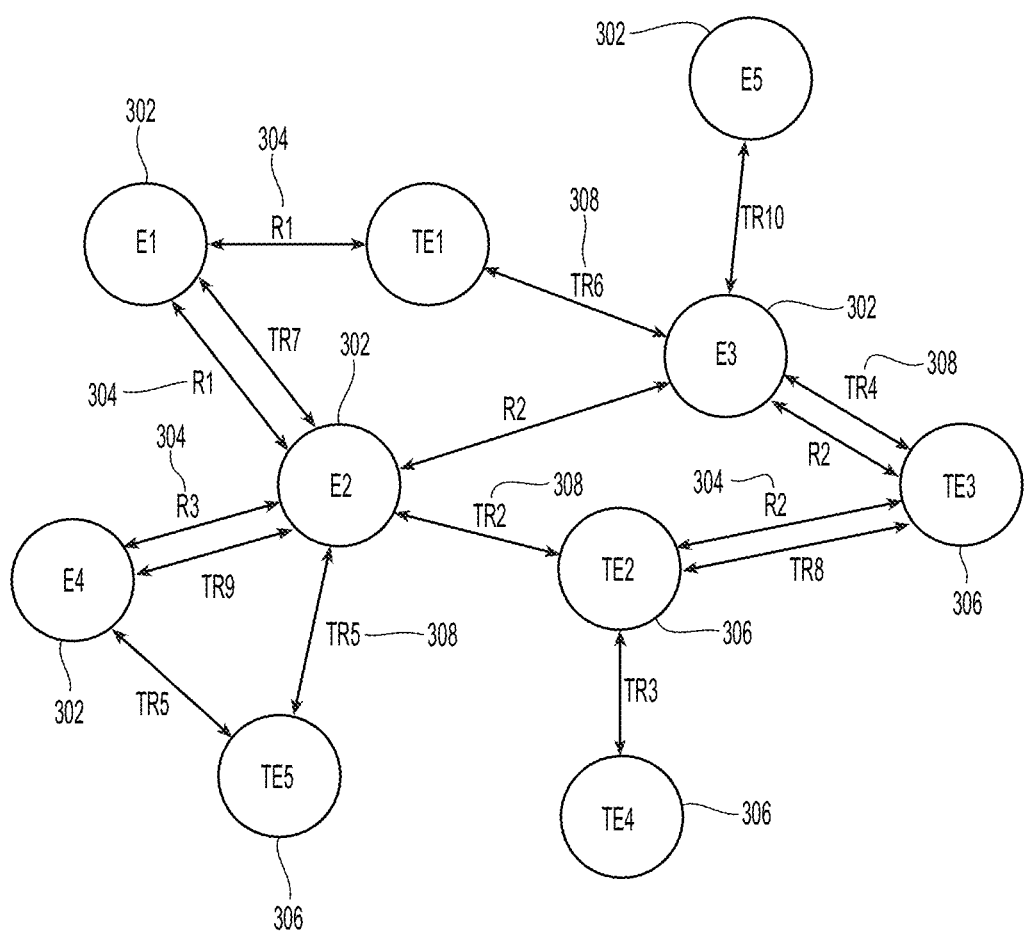
FIG. 3 is a schematic representation of an embodiment of an augmented caption graph for use in producing an augmented image caption.

Referring to FIG. 3, an exemplary embodiment of an augmented caption graph is illustrated. The caption graph includes entity nodes (E1, E2, E3, E4, E5) connected by relationship edges (R1, R2, R3). The contextual graph includes entity nodes 302 (E1, E3), textual entity nodes 306 (TE1, TE2, TE3, TE4, TE5) and textual relationships 308 (TR1, TR2, TR3, TR4, TR5, TR6, TR7, TR8, TR9). The textual relationships can be identical or similar to an existing entity relationship (R1 and TR7, TR4 and R2, TR8 and R2, R3 and TR9) or can be unique to the contextual graph (TR5, TR6, TR2). Therefore, after overlying the contextual graph on the caption graph and aligning common entities (E1 and E3), a plurality of portions of the augmented graph, corresponding to node-edge-node triples are identified having different degrees of overlap. These plurality of portions of the contextual graph include, for example, a pair of entity nodes connected by a textual relationship edge that is equivalent to a relationship edge between the pair of entity nodes in the caption graph (E1, TR7, E2), a pair of entity nodes connected by a textual relationship edge that is related to a relationship edge between the pair of entity nodes in the caption graph (E4, TR9, E2), a pair of entity nodes connected by a textual relationship edge that is unique to the contextual graph (E3, TR10, E5), an entity node and textual entity node pair connected by a textual relationship edge that is equivalent to a relationship edge in the caption graph (E3, TR4, TE3), an entity node and textual entity node pair connected by a textual relationship edge that is unique to the contextual graph (E4, TR5, TE5), a pair of textual entity nodes connected by a textual relationship edge that is equivalent to a relationship edge in the caption graph (TE2, TR8, TE3), a pair of textual entity nodes connected by a textual relationship edge that is unique to the contextual graph (TE2, TR3, TE4) and other combinations thereof. Each one of these pairs is assigned a given relevance weight for example, (E2, R2, E3)=1, (E1, TR7, E2)=0.9, (E4, TR9, E2)=0.85, (E3, TR10, E5)=0.75, (E3, TR4, TE3)=0.65, (E4, TR5, TE5)=0.5, (TE2, TR8, TE3)=0.25 and (TE2, TR3, TE4)=0.1. A predetermined threshold for relevance weight can be identified, for example, 0.5.

Returning to FIG. 4, the augmented caption graph is used to generate a natural language description of the image 226. In one embodiment, a natural language generation engine sequentially describes node-edge-node triples in the augmented caption graph, for example, beginning with the highest relevance weights and stopping when all triples above the predetermined threshold weight have been used to contribute to the natural language description. The natural language description is then stored in the database in association with the image and the particular document containing that image in association with the relevant text. The natural language description can be used as a displayed caption for the image, ALT text associated with the image and a combinations thereof. In one embodiment, the natural language description is used to generate an audible description of the image.

Figure 4:
FIG. 4 is an embodiment of an image to receive an augmented image caption.

Referring now to FIG. 4, an example of an image 400 for which an augmented caption is to be generated is illustrated. The associated document is a news article, published in an online format, and the image is embedded in the text of the article. After obtaining the text of the article, the following portion of the article text is identified as text relevant to the content of the image.

City, Country (News Agency) With nothing but the clothes on his back and less than $300 in his pocket John Doe was put on a plane and returned to the country he left 39 years ago to pursue his Second Country dream. His 94-year-old mother sat in a wheelchair at the arrivals gate, overcome with emotion as she waited for him. She hadn't seen him in 20 years. As he walked out, his siblings, nephews and nieces broke out in cheers. But they were soon in tears.

The text in this relevant portion of the article is analyzed the text using an NLP engine. Based on this analysis, the overall sentiment expressed in the image is 39% negative. An analysis of the overall emotion expressed in the image returns joy at 14%, anger at 10%, disgust at 13%, sadness at 72% and fear at 7%. Keywords in the text are identified for use as nodes, i.e., textual entity nodes, in the contextual graph. These keyword, and their associated relevance to the image, are John Doe at 95%, arrivals gate at 78%, Second Country dream at 72%, 94-year-old mother at 71% and Country at 54%.

Contextual or semantic relations that can be used to populate the contextual graph are identified.

```
{
"semantic_roles": [
{
"subject": {
"text"; "John Doe"
},
"sentence": " City, Country (News Agency) With nothing but the clothes on his back and less than $300 in his pocket John Doe was put on a plane and returned to the country he left 39 years ago to pursue his Second Country dream.",
"object": {
"text": "put on a plane"
},
"action": {
"verb": {
"text"; "be",
"tense"; "past"
},
"text"; "was",
"normalized": "be"
}
},
{
"subject": {
"text": "he"
},
"sentence"; " City, Country (News Agency) With nothing but the clothes on his back and less than $300 in his pocket John Doe was put on a plane and returned to the country he left 39 years ago to pursue his Second Country dream. ",
"object":
{ "text": "the country"
}.
"action": {
"verb"; {
"text": "leave",
"tense": "past"
}.
"text": "left".
"normalized": "leave"
}
},
{
"subject": {
"text": "he"
},
"sentence": " City, Country (News Agency) With nothing but the clothes on his back and less than $300 in his pocket John Doe was put on a plane and returned to the country he left 39 years ago to pursue his Second Country dream. ",
"object": {
"text": "his Second Country dream"
},
```

```
"action": {
"verb": {
"text": "pursue",
"tense": "future"
},
"text": "to pursue",
"normalized": "to pursue"
},
{
"subject": {
"text": "His 94-year-old mother"
},
"sentence": " His 94-year-old mother sat in a wheelchair at the arrivals gate, overcome with emotion as she waited for him.",
"object": {
"text": "in a wheelchair at the arrivals gate"
},
"action": {
"verb": {
"text": "sit",
"tense": "past"
},
"text": "sat",
"normalized": "sit"
},
{
"subject": {
"text"; "His 94-year-old mother"
},
"sentence"; " His 94-year-old mother sat in a wheelchair at the arrivals gate, overcome with emotion as she waited for him.",
"object": {
"text": "with emotion"
},
"action": {
"verb": {
"text": "overcome",
"tense": "past"
},
"text": "overcome",
"normalized": "overcome"
},
{
"subject": {
"text": "She"
},
"sentence": " She hadn't seen him in 20 years. ",
"object": {
"text": "hadn't seen him"
},
"action": {
"verb": {
"text": "have",
"tense": "past"
},
"text": "had",
"normalized": "have"
}
},
{
 "subject": {
"text": "She"
 },
 "sentence": " She hadn't seen him in 20 years. ",
 "object": {
  "text": "him"
 },
 "action": {
 "verb": {
 "text": "see",
 "tense": "past",
  "negated": true
},
"text": "seen",
"normalized": "see"
 }
},
{
 "subject": {
```

```
    "text": "they"
  }.
"sentence": " But they were soon in tears.",
"action": {
"verb": {
"text": "be",
"tense": "past"
},
"text": "were",
"normalized": "be"
    }
   }
  ]
}
```

A conventional caption provided with the image or generated using a conventional, non-contextual description of the image would likely produce: "An old lady sitting on a wheelchair with a group of people". The augmented caption generated from an augmented caption graph using the contextual graph that results from the analysis of the relevant text is: "John Doe, returned from Second Country, hugging his mother on her wheelchair, and people are with mixed feelings."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, apart from limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 5:
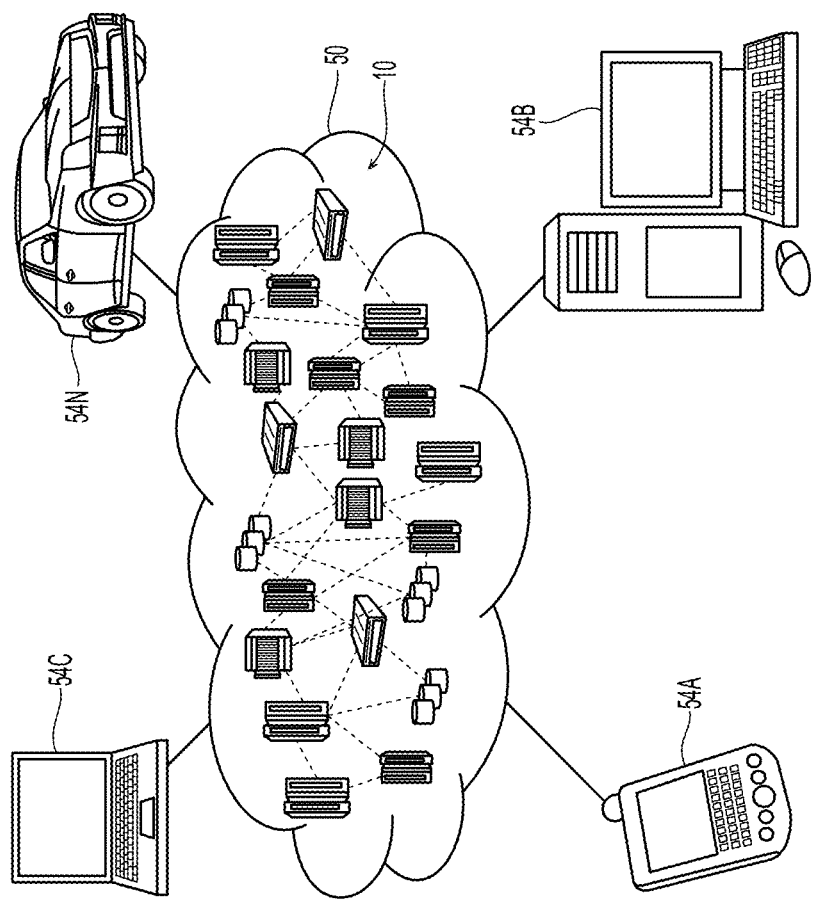
FIG. 5 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 5, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection, e.g., using a web browser.

Figure 6:
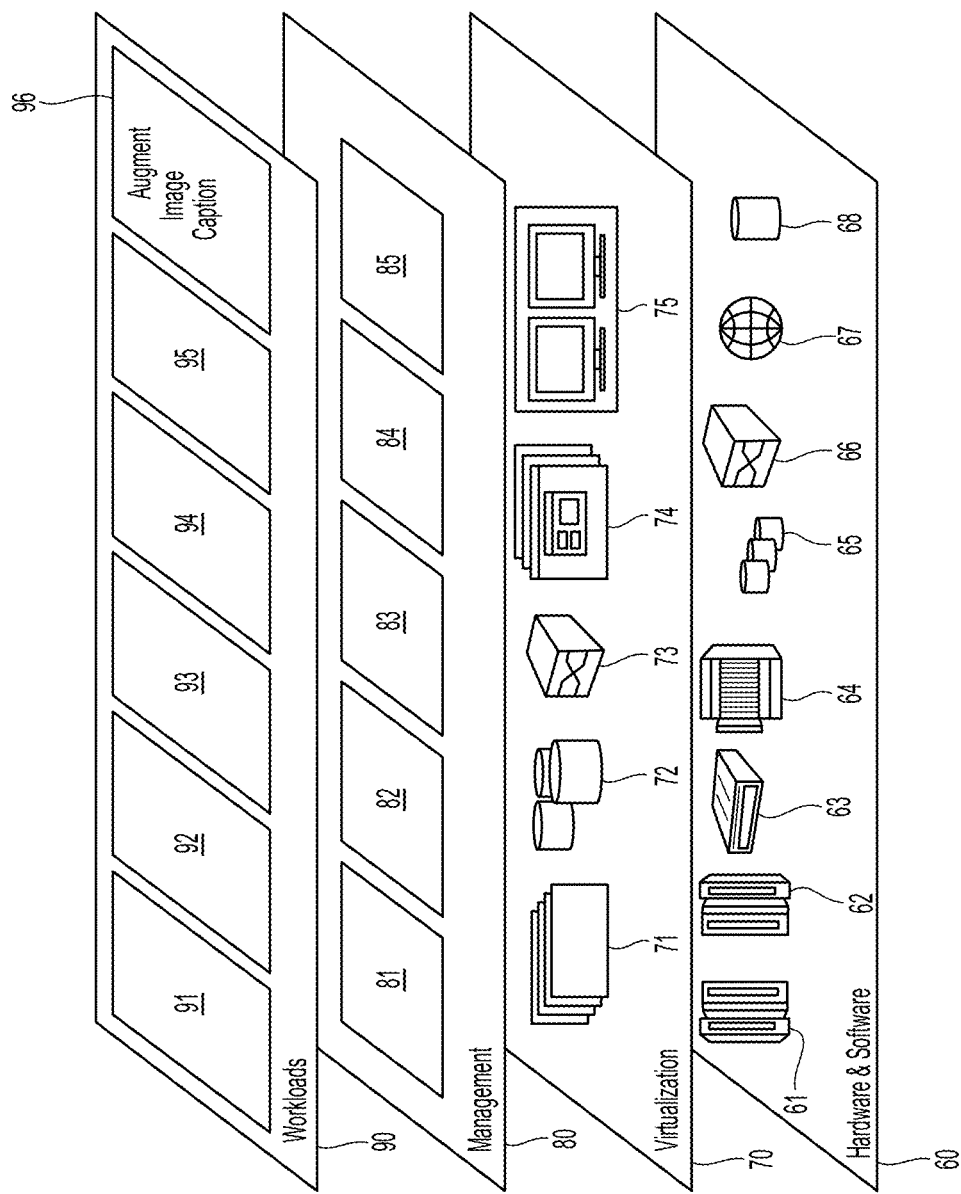
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 4 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmenting an image caption 96.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for augmenting image captions and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for augmenting an image caption, the method comprising:
    generating a caption graph for an image, the caption graph comprising entity nodes corresponding to entities contained in the image and relationship edges between entity nodes corresponding to relationships between entities as illustrated in the image;
    generating a contextual graph for the image, the contextual graph comprising one or more of entity nodes corresponding to entities contained in the image and described in text associated with the image, textual entity nodes corresponding to textual entities described in text associated with the image and textual relationship edges between one or more of entity node pairs, textual entity node pairs and entity node and textual entity node pairs, the textual relationship edges corresponding to relationships described in the text associated with the image between entity pairs, textual entity pairs or entity and textual entity pairs;
    using the contextual graph to generate an augmented caption graph comprising the entity nodes, the relationship edges and one or more textual relationship edges; and
    augmenting an existing caption for the image using the augmented caption graph.

2. The method of claim 1, wherein:
    the relationship edges correspond to tone agnostic and emotion agnostic relationships between entities as illustrated in the image;
    the textual relationship edges comprise relationships between entities that express tone or emotion of text surrounding the image; and
    the augmenting the existing caption for the image includes contextualizing the existing caption with the tone or emotion.

3. The method of claim 1, wherein the augmented caption graph comprises one or more textual entity nodes.

4. The method of claim 3, wherein using the contextual graph to generate the augmented caption graph comprises:
    overlaying the caption graph and the contextual graph by aligning common edges and nodes to generate an augmented caption graph; and
    assigning a relevance weight to each one of a plurality of portions of the contextual graph.

5. The method of claim 4, wherein each one of the plurality of portions of the contextual graph comprises a triple comprising an entity pair connected by an edge.

6. The method of claim 4, wherein the plurality of portions of the contextual graph comprise a pair of entity nodes connected by a textual relationship edge that is equivalent to a relationship edge between the pair of entity nodes in the caption graph, a pair of entity nodes connected by a textual relationship edge that is related to a relationship edge between the pair of entity nodes in the caption graph, a pair of entity nodes connected by a textual relationship edge that is unique to the contextual graph, an entity node and textual entity node pair connected by a textual relationship edge that is equivalent to a relationship edge in the caption graph, an entity node and textual entity node pair connected by a textual relationship edge that is unique to the contextual graph, a pair of textual entity nodes connected by a textual relationship edge that is equivalent to a relationship edge in the caption graph, a pair of textual entity nodes connected by a textual relationship edge that is unique to the contextual graph, or combinations thereof.

7. The method of claim 4, wherein assigning a relevance weight further comprises assigning a relevance weight corresponding to a percentage overlap between a given portion of the contextual graph and the caption graph.

8. The method of claim 1, wherein the method further comprises using the augmented caption graph to generate a natural language description of the image.

9. The method of claim 8, wherein the method further comprises using the natural language description as a displayed caption for the image, ALT text associated with the image or a combination thereof.

10. The method of claim 1, wherein generating the caption graph further comprises using a description of entities in the image and relationships among the entities as illustrated in the image.

11. The method of claim 10, wherein the description of entities and relationships among the entities comprises a displayed caption for the image, ALT text associated with the image or a combination thereof.

12. The method of claim 10, wherein the method further comprises using deep learning to extract the description of entities in the image and relationships among the entities as illustrated in the image.

13. A computer program product stored in a computer-readable storage medium containing a computer-readable code that when read by a computer causes the computer to perform a method for augmenting an image caption, the method comprising:
    generating a caption graph for an image, the caption graph comprising entity nodes corresponding to entities contained in the image and relationship edges between entity nodes corresponding to relationships between entities as illustrated in the image;
    generating a contextual graph for the image, the contextual graph comprising one or more of entity nodes corresponding to entities contained in the image and described in text associated with the image, textual entity nodes corresponding to textual entities described in text associated with the image and textual relationship edges between one or more of entity node pairs, textual entity node pairs and entity node and textual entity node pairs, the textual relationship edges corresponding to relationships described in the text associated with the image between entity pairs, textual entity pairs or entity and textual entity pairs;
    using the contextual graph to generate an augmented caption graph comprising the entity nodes, the relationship edges and one or more textual relationship edges; and
    augmenting an existing caption for the image using the augmented caption graph.

14. The computer program product of claim 13, wherein the augmented caption graph comprises one or more textual entity nodes.

15. The computer program product of claim 14, wherein using the contextual graph to generate the augmented caption graph comprises:
- overlaying the caption graph and the contextual graph by aligning common edges and nodes to generate an augmented caption graph; and
- assigning a relevance weight to each one of a plurality of portions of the contextual graph.

16. The computer program product of claim 15, wherein the plurality of portions of the contextual graph comprise a pair of entity nodes connected by a textual relationship edge that is equivalent to a relationship edge between the pair of entity nodes in the caption graph, a pair of entity nodes connected by a textual relationship edge that is related to a relationship edge between the pair of entity nodes in the caption graph, a pair of entity nodes connected by a textual relationship edge that is unique to the contextual graph, an entity node and textual entity node pair connected by a textual relationship edge that is equivalent to a relationship edge in the caption graph, an entity node and textual entity node pair connected by a textual relationship edge that is unique to the contextual graph, a pair of textual entity nodes connected by a textual relationship edge that is equivalent to a relationship edge in the caption graph, a pair of textual entity nodes connected by a textual relationship edge that is unique to the contextual graph, or combinations thereof.

17. The computer program product of claim 13, wherein the method further comprises:
- using the augmented caption graph to generate a natural language description of the image; and
- using the natural language description as a displayed caption for the image, ALT text associated with the image or a combination thereof.

18. The computer program product of claim 13, wherein:
- the method further comprises using deep learning to extract a description of entities in the image and relationships among the entities as illustrated in the image; and
- generating the caption graph further comprises using the description of entities in the image and relationships among the entities as illustrated in the image.

19. A system for augmenting an image caption, the system comprising:
- a database storing image files for one or more images, text files containing text to be displayed in association with each image and ALT text associated with one or more images;
- a caption generating system to obtain a description of the image;
- a natural language processor to use the description of the image to identify entities and relationships among the entities in the given image and to analyze text to be displayed in association with the given image to identify entities contained in the given image and described in the text, textual entities described in the text and textual relationships described in the text between entity pairs, textual entity pairs or entity and textual entity pairs; and
- a knowledge graph builder to:
  - use the identified entities and relationships among the entities to generate a caption graph for the given image, the caption graph comprising entity nodes corresponding to the entities contained in the image and relationship edges between entity nodes corresponding to the relationships between entities;
  - generate a contextual graph for the image, the contextual graph comprising one or more of entity nodes corresponding to entities contained in the image and described in text associated with the entity, textual entity nodes corresponding to textual entities described in text associated with the image and textual relationship edges between one or more of entity node pairs, textual entity node pairs and entity node and textual entity node pairs;
  - overlay the caption graph and the contextual graph by aligning common edges and nodes to generate an augmented caption graph;
  - assign a relevance weight to each one of a plurality of portions of the contextual graph that corresponds to a percentage overlap in the augmented caption graph between a given portion of the contextual graph and the caption graph, wherein the textual relationships comprise emotion, concepts, tone, semantic identification of relationships between entities or combinations thereof, and
  - augmenting an existing caption for the image using the augmented caption graph.

20. The system of claim 19, wherein the caption generating system uses deep learning to obtain the description of the image; and
the system further comprises a natural language generation engine that uses the augmented caption graph to generate a natural language description of the image by describing the caption graph and those portions of the contextual graph having an assigned relevance weight above a predetermined threshold.

* * * * *